United States Patent
Clauvelin

(10) Patent No.: US 10,846,489 B2
(45) Date of Patent: Nov. 24, 2020

(54) ANALOG COMPUTING IMPLEMENTING ARBITRARY NON-LINEAR FUNCTIONS USING CHEBYSHEV-POLYNOMIAL-INTERPOLATION SCHEMES AND METHODS OF USE

(71) Applicant: Sendyne Corporation, New York, NY (US)

(72) Inventor: Nicolas Clauvelin, New York, NY (US)

(73) Assignee: Sendyne Corporation, New York, NY (US)

( * ) Notice: Subject to any disclaimer, the term of this patent is extended or adjusted under 35 U.S.C. 154(b) by 0 days.

(21) Appl. No.: 16/618,340

(22) PCT Filed: Jul. 17, 2019

(86) PCT No.: PCT/IB2019/056120
§ 371 (c)(1),
(2) Date: Nov. 30, 2019

(87) PCT Pub. No.: WO2020/021396
PCT Pub. Date: Jan. 30, 2020

(65) Prior Publication Data
US 2020/0293725 A1     Sep. 17, 2020

Related U.S. Application Data
(60) Provisional application No. 62/701,975, filed on Jul. 23, 2018.

(51) Int. Cl.
*G06G 7/30* (2006.01)
*G06F 17/17* (2006.01)
*G06G 7/22* (2006.01)

(52) U.S. Cl.
CPC ............... *G06G 7/30* (2013.01); *G06F 17/17* (2013.01); *G06G 7/22* (2013.01)

(58) Field of Classification Search
CPC ............ G06G 7/30; G06G 7/22; G06F 17/17
(Continued)

(56) References Cited

U.S. PATENT DOCUMENTS

| 8,165,309 B2 | 4/2012 | Gustaffsson |
| 2004/0258176 A1 | 12/2004 | Mattsson |
| 2014/0324936 A1 | 10/2014 | Alexander et al. |

FOREIGN PATENT DOCUMENTS

| KR | 1020150054245 A | 5/2015 |
| WO | 2005116862 A2 | 12/2005 |

OTHER PUBLICATIONS

International search report in international patent application No. PCT/IB2019/056120, dated Nov. 13, 2019.
(Continued)

*Primary Examiner* — Tan V Mai
(74) *Attorney, Agent, or Firm* — Oppedahl Patent Law Firm LLC

(57) ABSTRACT

The inventive disclosures described herein pertain to an improved physical analog computer that features the ability to evaluate arbitrary non-linear functions using an interpolation method based on Chebyshev polynomials. What has been developed is an improved method for non-linear-function generation in hybrid computing that relies on Chebyshev interpolation. The method requires an initial computation of the interpolation coefficients, which is to be carried out in the digital domain. These coefficients, along with the domain of definition of the non-linear function to be generated, are used during the programming of the analog domain to set multiplier and summer elements.

5 Claims, 3 Drawing Sheets

(58) Field of Classification Search
USPC .............................................................. 708/4
See application file for complete search history.

(56) References Cited

OTHER PUBLICATIONS

Written Opinion in international patent application No. PCT/IB2019/056120, dated Nov. 13, 2019.

ANALOG COMPUTING IMPLEMENTING ARBITRARY NON-LINEAR FUNCTIONS USING CHEBYSHEV-POLYNOMIAL-INTERPOLATION SCHEMES AND METHODS OF USE

CROSS-REFERENCE TO RELATED APPLICATIONS

This patent application claims the priority benefit of U.S. patent application Ser. No. 62/701,975, filed on Jul. 23, 2018 for "Method for implementing arbitrary non-linear functions in analog computing." Further, this patent application hereby incorporates by reference U.S. patent application Ser. No. 62/701,975 for all purposes. Should any irreconcilable conflicts arise between this patent application and the teachings of U.S. patent application Ser. No. 62/701,975 for purposes of claim construction/interpretation, then this patent application's teachings shall govern.

BACKGROUND

Most computation in the present day is carried out by digital computers executing stored programs. Many whose lives are immersed in the world of digital computers are aware of analog computing only as a thing of historical interest—a way that people used to carry out computations before the replacement of analog computers by digital computers. What has, however, become clear in recent years is that there are some things even now that an analog computer can do better than a digital computer can do. And there are smart ways to permit a digital computer to work in concert with an analog computer, yielding what is sometimes termed "hybrid computing".

This patent application directs itself to computation carried out by analog computers. It is important for the reader to appreciate that this patent application does not direct itself to digital simulation of analog computing. This patent application directs itself to physical analog computers which carry out computations in an analog way. In particular, this patent application directs itself to improvements in the design and function of physical analog computers.

The improved analog computers benefiting from the teachings of this patent application can then work in concert with digital computers to provide hybrid computing results that are better than previous hybrid computing results.

Some physical analog computers use voltages to represent the values being calculated. Other physical analog computers use currents to represent the values being calculated. With either approach, a number of building blocks make up the physical analog computer. For an analog computer that uses voltages to represent values, the typical building blocks include voltage sources, potentiometers (serving as voltage dividers), operational amplifiers configured as summers, and operational amplifiers configured as integrators. Other computing elements typically include analog multipliers, non-linear function generators, and analog comparators.

Some discussion of what exactly a nonlinear function generator is may be helpful for some readers. In this context a nonlinear function generator is a physical circuit element having an analog electrical input (either a current or a voltage) that represents a numerical value, and having an analog electrical output (again, depending on the type of analog computer, the output might be a current or a voltage) which represents a numerical value. In a voltage-based analog computer, the input might for example be a voltage representing an angle and the output might be a voltage representing the sine of that angle. If so, then we would say that this function generator is a "sine" function generator.

This patent application particularly directs itself to an improved way to provide the physical computing element that is a nonlinear function generator.

Most applications of analog or hybrid computing (for example the task of solving a set of differential equations) require the evaluation of non-linear functions as part of the analog calculation. For example, sine or cosine functions might be required to solve a particular problem. Evaluating such functions on digital computers is a routine task; however, on an analog computer it requires the development of a method to generate the values of such functions.

A common approach to deal with non-linear-function generation in analog computing is the continuous-time-table-lookup method. The implementation of such a method is presented in the publication N. Guo, Y. Huang, T Mai, S. Patil, C. Cao, M Seok, S. Sethumadhavan, Y. Tsividis, "Energy-efficient hybrid analog/digital approximate computation in continuous time," IEEE Journal of Solid-State Circuits 51 (7) (2016) 1514-1524, as well as in U.S. Pat. No. 5,006,850 (issued on Apr. 9, 1991) to G. J. Murphy for "Function Transformer." Disadvantages of the continuous-time-table-lookup method are:

The continuous-time table lookup requires a storage medium, and analog-to-digital/digital-to-analog devices, and accordingly can result in excessive processing time and use of system resources; and The accuracy of the values generated by the continuous-time table lookup method depends on the size of the storage medium and the resolution of the analog-to-digital/digital-to-analog devices.

It should also be noted that the continuous-time-lookup-table method does not do any interpolating. Any value that is generated at the output of the function generator is simply the value based upon the information stored in the lookup table.

What is needed is a robust and efficient means for analog-computing systems to evaluate nonlinear functions. Given that adders and multipliers are commonly available building blocks in an analog computer, it would be helpful if some approach could be found that required the use only of adder and multiplier analog elements. It would be helpful if the approach could be flexible enough that it could be tailored to provide whatever degree of accuracy that is desired for the specific needs of a given application.

BRIEF SUMMARY

The inventive disclosures described herein pertain to an improved physical analog computer that features the ability to evaluate arbitrary non-linear functions using an interpolation method based on Chebyshev polynomials. What has been developed is an improved method for non-linear-function generation in hybrid computing that relies on Chebyshev interpolation. The method requires an initial computation of the interpolation coefficients, which is to be carried out in the digital domain. These coefficients, along with the domain of definition of the non-linear function to be generated, are used during the programming of the analog domain to set adder elements and multiplier elements.

The foregoing Brief Summary is intended to merely provide a short, general overview of the inventive disclosure described throughout this patent application, and therefore, is not intended to limit the scope of the inventive disclosure contained throughout the balance of this patent application, including any appended claims and drawings.

DETAILED DESCRIPTION

I. Overview

Figure 1:
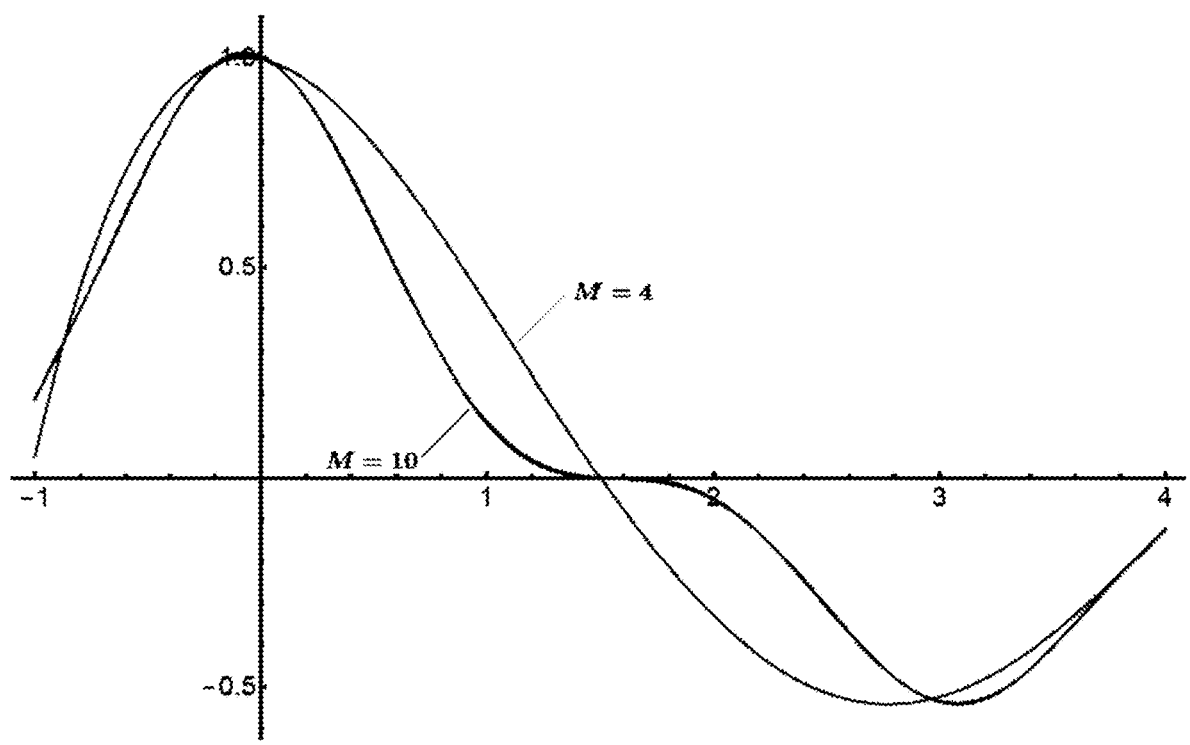
FIG. 1 depicts one embodiment of a Chebyshev interpolation example. The graph shows three curves—the original function that is being approximated by the function generator (interpolator), an interpolation with order M=4, and an interpolation with order M=10. (The original function, assuming the horizontal axis to be the variable "u", is $\cos(u)^3 e^{-0.2u}$.) The curve showing the original function and the curve showing the interpolation with order M=10 are so close together that the two curves almost cannot be distinguished in the figure. Said differently, what may be seen is that the M=4 interpolation is fairly close but the M=10 interpolation is extremely close when compared with the original function.

The inventive disclosures described herein pertain to an improved physical analog computer that features the ability to evaluate arbitrary non-linear functions using an interpolation method based on Chebyshev polynomials. What has been developed is an improved method for non-linear-function generation in hybrid computing that relies on Chebyshev interpolation. The method requires an initial computation of the interpolation coefficients, which is to be carried out in the digital domain. These coefficients, along with the domain of definition of the non-linear function to be generated, are used during the programming of the analog domain to set adder elements and multipliers elements.

Saying this in a different way, the sequence of steps includes:

Identify a function that it is desired to generate in the analog computer;

Define the domain of the function for purposes of the application;

Decide how accurate the function generator needs to be for a particular application;

Work out the order (here, the value of M) required to arrive at the desired level of accuracy;

Arrive at interpolation coefficients by means of digital computation;

In the function generator of the analog computer, set up multipliers and summers and coefficient values to bring about the function generator result;

And after all of this has been done, carry out an analog computation making use of the function generator resulting from the steps just mentioned.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification, drawings, and any appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "analog computer," as used in this specification, drawings, and any appended claims, refers to a type of computer that uses the continuously changeable aspects of physical phenomena such as electrical, mechanical, or hydraulic quantities to model a problem being solved. In contrast, digital computers represent varying quantities symbolically, as their numerical values change. Because an analog computer does not use discrete values, but rather uses continuous values, processes cannot necessarily be reliably repeated with exact equivalence. However, unlike digital-signal processing in digital computers, analog computers do not suffer from the discrete error caused by quantization noise. Analog computers are subject to signal errors/perturbations from induced electronic noise. Analog computers and/or hybrid analog-digital computers ("hybrid computers") are often used in scientific and industrial applications to perform control and protective functions. For the purposes of the disclosures contained herein, all references to "analog computers" are intended to also encompass "hybrid computers."

III. An Improved Analog Computer Using Interpolation of Chebyshev Polynomials to Evaluate Non-Linear Functions This Section III is directed generally to an improved analog computer that features the ability to evaluate arbitrary non-linear functions in real-world applications using an interpolation method based on Chebyshev polynomials in real-world applications. Refer to FIGS. 1 through 5.

A. Overview of Mathematical Framework for Chebyshev Interpolation

1. Chebyshev Polynomials

Chebyshev polynomials of the first kind can be written as:

$$T_n(x) = \cos(n \arccos(x)) \quad \text{(Equation 1)}$$

Where:
X is a real variable in the range [−1, 1]; and
n is a positive integer (n=0, 1, 2, . . . ) indexing the polynomials (there is an infinite amount of them).

These polynomials are referred to as the Chebyshev polynomials hereinafter.

The zeros of the Chebyshev polynomials are of particular interest for interpolation. A given Chebyshev polynomial, $T_n$, has n zeros denoted $x_k^0$ and given by:

$$x_k^0 = \cos\left(\frac{2k+1}{2n}\pi\right) \quad \text{(Equation 2)}$$

Where:
k=0, 1, . . . , n−1.
Therefore, by definition:

$$T_n x_k^0 = 0 \quad \text{(Equation 3)}$$

Hereinafter, the values $x_k^0$ will be referred to as the Chebyshev nodes. An interesting property of the Chebyshev polynomials is that they can be related through the following three-term recurrence relation:

$$T_{n+1}(x) = 2 \times T_n(x) - T_{n-1}(x) \quad \text{(Equation 4)}$$

for any integer n≥1, and
with the initial values $T_0(x)=1$ and $T_1(x)=x$.

Finally, the discrete form of the orthogonality relation between Chebyshev polynomials, without further detail is given by:

$$\sum_{i=0}^{i=n} T_p(x_i^0) T_q(x_i^0) = K_p \delta_{pq} \quad \text{(Equation 5)}$$

Where:
n is a strictly positive integer;
p and q are positive integers such that p≤n and q≤n;
$x_i^0$ are the zeros of the Chebyshev polynomial $T_{n+1}(x)$ as defined in Equation 2, above.

In this expression, $K_o=(n+1)$ and $K_p=(n+1)/2$.

The $\delta_{pq}$ refers to the so-called "Kronecker delta" defined as being zero except when p=q when it equals 1.

This result shows that Chebyshev polynomials are an orthogonal basis on the interval [−1,1], which makes it possible to project an arbitrary function onto them.

2. Chebyshev Interpolation

Consider an arbitrary real function f(u) defined in the interval [a,b]. The goal of an interpolation scheme is to derive a function I(u) that approximates the function f(u) over the interval [a,b]. The quality of approximation can be measured in various ways and is discussed later in this disclosure.

The various results for the Chebyshev interpolation strategy are developed and later leveraged for non-linear functions generation in an improved analog computer.

a. Range Transformation

The Chebyshev polynomials are defined in the [−1,1] interval, but the function to be interpolated is defined in an arbitrary [a,b] interval. A linear transformation of variables is now defined that makes it possible to map these two intervals. The variable u is defined in [a,b], and the corresponding variable x is defined in [−1,1]. The mapping from x to u is given by:

$$u(x) = \frac{a+b}{2} + \frac{b-a}{2}x \quad \text{(Equation 6)}$$

The mapping between u to x is given by:

$$x(u) = \frac{2u}{b-a} - \frac{a+b}{b-a}x \quad \text{(Equation 7)}$$

For the function to be interpolated; that is, f(u) as defined in [a,b], the following can be written:

$$f(u) = f\left(\frac{a+b}{2} + \frac{b-a}{2}x\right) = \hat{f}(x) \quad \text{(Equation 8)}$$

That is, function $\hat{f}(x)$ is defined in [−1,1], which is equal to the original function f(u). This implies that the interpolation of $\hat{f}(x)$ is denoted by $\hat{I}(x)$ (the interpolant).

3. Interpolation Order and Nodes

The quality and accuracy of the interpolation is controlled by the interpolation order, which relates to the number of Chebyshev polynomials that will be used in the interpolant. The order of the interpolation is denoted by M; that is, the first M+1 Chebyshev polynomials in the interpolation (from $T_0$ to $T_M$) are used. An interpolation is always defined with respect to set of discrete values, referred to as "the interpolation nodes," at which the original function is evaluated. The zeros of $T_{M+1}(x)$ are used as the interpolation nodes and these zeros are defined as (as derived from Equation 2 above):

$$x_k^0 = \cos\left(\frac{2k+1}{2(M+1)}\pi\right) \quad \text{(Equation 9)}$$

Where:
k=0, 1, . . . , n−1.

a. Projection onto Chebyshev Polynomials

Assuming that interpolant $\hat{I}(x)$ is of the form:

$$\hat{I}(x) = \sum_{i=0}^{i=M} c_i T_i(x) \quad \text{(Equation 10)}$$

Where:
The interpolant is a linear combination of the first M+1 Chebyshev polynomials; and
The equations form a linear system with respect to coefficients $c_i$.

As a result, a linear system of M+1 equations can be built by requiring that at the interpolation nodes the interpolant value is equal to the function value, that is:

$$\hat{I}(x_k^0) = \sum_{i=0}^{i=M} c_i T_i(x_k^0) = \hat{f}(x_k^0) \quad \text{(Equation 11)}$$

Where:

k=0, 1, . . . , M; and

M+1 equations form a linear system with respect to coefficients $c_i$.

Because Chebyshev polynomials form an orthogonal basis, this linear system has a well-defined unique solution. With the help of the orthogonality relation given in Equation 5, above, the following can be expressed:

$$\sum_{j=0}^{j=M} \hat{f}(x_j^0) T_p(x_j^0) = \sum_{j=0}^{j=M} \sum_{i=0}^{i=M} c_i T_i(x_j^0) T_p(x_j^0) \quad \text{(Equation 12a)}$$

$$¿ \sum_{i=0}^{i=M} c_i K_i \delta_{ip} \quad \text{(Equation 12b)}$$

$$¿ c_p K_p. \quad \text{(Equation 12c)}$$

This implies that the coefficients $c_i$ introduced earlier can be calculated from the function to be interpolated $\hat{f}(x)$ using the following formulas:

$$c_0 = \frac{1}{M+1} \sum_{j=0}^{j=M} \hat{f}(x_j^0) T_0(x_j^0) ¿ = \frac{1}{M+1} \sum_{j=0}^{j=M} \hat{f}(x_j^0) \quad \text{(Equation 13a)}$$

$$c_k = \frac{2}{M+1} \sum_{j=0}^{j=M} \hat{f}(x_j^0) T_k(x_j^0) ¿ = \frac{1}{M+1} \sum_{j=0}^{j=M} \hat{f}(x_j^0), \quad \text{(Equation 13b)}$$

$$1 \geq k \geq M$$

4. Remarks

The results derived in this Section III provide the necessary definitions for an improved non-linear-function-generation method applied to hybrid computing. The following are a few related remarks:

Choosing the Chebyshev nodes as the interpolation nodes is designed to prevent Runge oscillations;

Interpolation error (with respect to the original function) will exhibit oscillations; however, the minimum-maximum values of these oscillations can be controlled by adjusting the interpolation order; and For common functions (e.g., cosine and sine) the improved method leads to accurate results at relatively low interpolation order; for example, with M=6, the cosine function can be approximated with a maximum error of 0.25%.

5. Example

Consider the following function in the interval [−1,4]:

$$f(u) = \cos(u)^3 \exp(0.20u) \quad \text{(Equation 14)}$$

Figure 2:
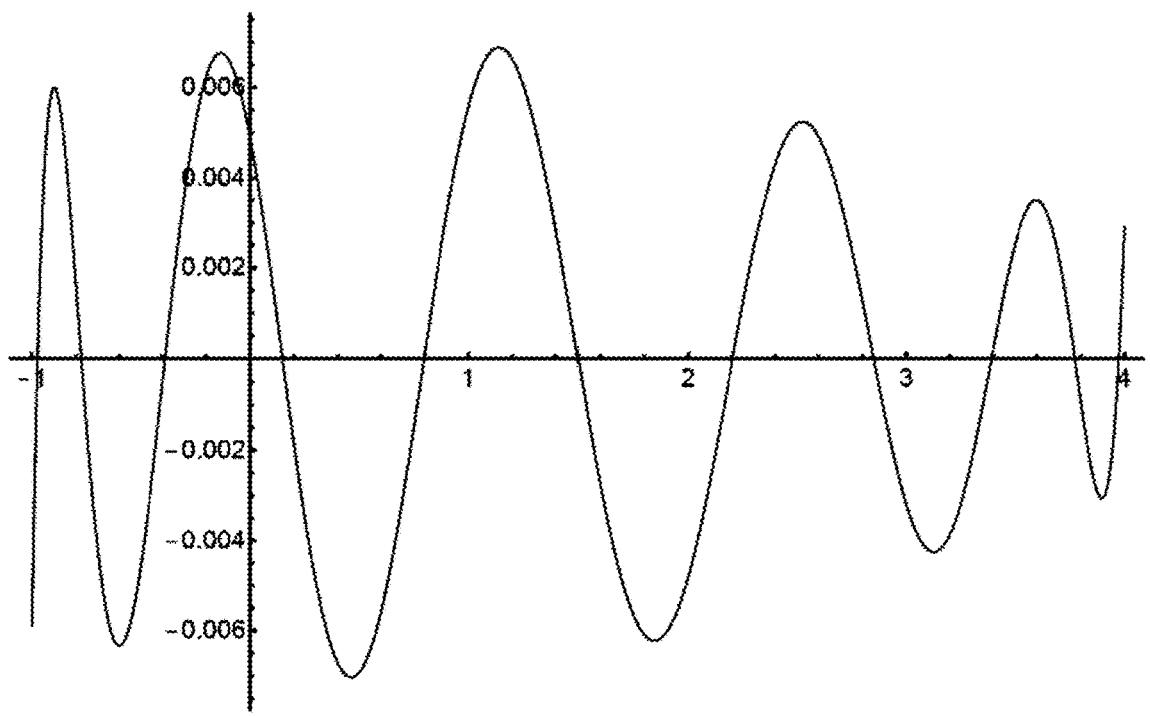
FIG. 2 depicts one embodiment of a Chebyshev interpolation error. The error plot is for the example function plotted in FIG. 1 and the interpolation is of the order M=10. The error is positive when the interpolant is larger than the interpolated function.

Refer to FIGS. 1 and 2. Interpolation examples for orders M=4 and M=10 are shown in FIG. 1. What is shown in FIG. 1 are three curves—the function being approximated, the result using an interpolation of order M=4, and the result using an interpolation of order M=10. As it turns out, the curve for the interpolation M=10 is very nearly visually indistinguishable (in this graph) from the original function. The error in the interpolant for M=10 is shown in FIG. 2.

B. Non-Linear-Function Generation for Hybrid Computing

This Subsection III.B presents an improved method for non-linear-function generation in hybrid computing applications. Within this improved method, and for a given non-linear function, the computation of the interpolant coefficients is performed in the digital domain. Once this initial computation is done, the analog domain can be programmed to generate the requested non-linear function.

The improved method also considers an arbitrary function f(u) defined in the interval [a,b]. The goal of the improved method is to provide a scheme so that part of the analog domain can be programmed to generate a function I(u) that approximates the function f(u).

1. Interpolant Computation in the Digital Domain

This process should be part of the overall programming of an improved hybrid computer for a problem that would require a non-linear function in the analog domain.

The following steps are performed in the digital domain:

i. Define the function $\hat{f}(x)$ as the mapping of f(u) to the interval [−1,1] (see Equation 7, above);

ii. For a given interpolation order M, compute the interpolant $\hat{I}(x)$ using Equations 13 and 2, above;

iii. Compare $\hat{I}(x)$ and $\hat{f}(x)$ using an error metric: If the error is below some pre-determined threshold, then the process is complete; otherwise, go back to Step ii and increase the interpolation order.

The comparison Step iii above requires an error metric, and a typical choice would be the root-mean-squared error, which can be defined as:

$$\text{RMS} = (\hat{f}, \hat{I}) = \sqrt{\frac{1}{2} \int_{-1}^{1} \overline{(\hat{f}(x) - \hat{I}(x))^2} dx} \quad \text{Equation 15}$$

The process then requires as input a maximum error value, and if the root-means-square (RMS) is below this maximum error value, then the interpolation is considered valid. In plain language, by this we mean that the order that was selected turned out to give rise to a generated output that tracked the true value of the function sufficiently closely. It should be noted that it is straightforward to show that the RMS value computed in [−1,1] is strictly equal to the value that would be computed in the interval [a,b]. The outputs of this process are the following data (and are required for the programming of the analog domain):

The values a and b defining the interval of the original function f(u); and

The M+1 coefficients for the calculation of the interpolant.

2. Non-Linear-Function Programming in the Digital Domain

Figure 3:
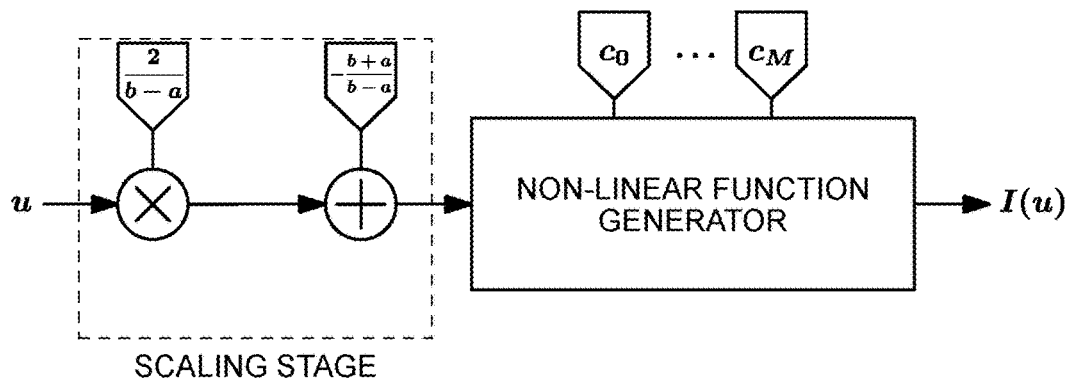
FIG. 3 depicts one embodiment of a simplified diagram of a Chebyshev-based non-linear function generator. The input is the value u, and the output is the value of the interpolant I(u). The first stage is a scaling stage that maps the value u to the [−1, 1] interval. The second stage is the non-linear-function generator itself.

An embodiment of the overall non-linear-function generator in the analog domain is shown in FIG. 3. It takes as input the value u, which is the value for which the non-linear function f(u) is to be evaluated, and produces as output the value of the interpolant I(u). Because the interpolant is designed to reproduce the original function up to a certain accuracy, the non-linear-function generator will be accurate up to this accuracy.

As shown in FIG. 3, there is an initial stage, which is a "scaling stage," and which simply implements Equation 7, above. This scaling stage is programmed with the values a and b, defining the interval of the original function.

The second and last stage is the non-linear-function generator itself, which is programmed with the values of the coefficients $c_0, \ldots, c_M$, which has been computed in the digital domain (see above).

a. Non-Linear-Function Generator

Figure 4:
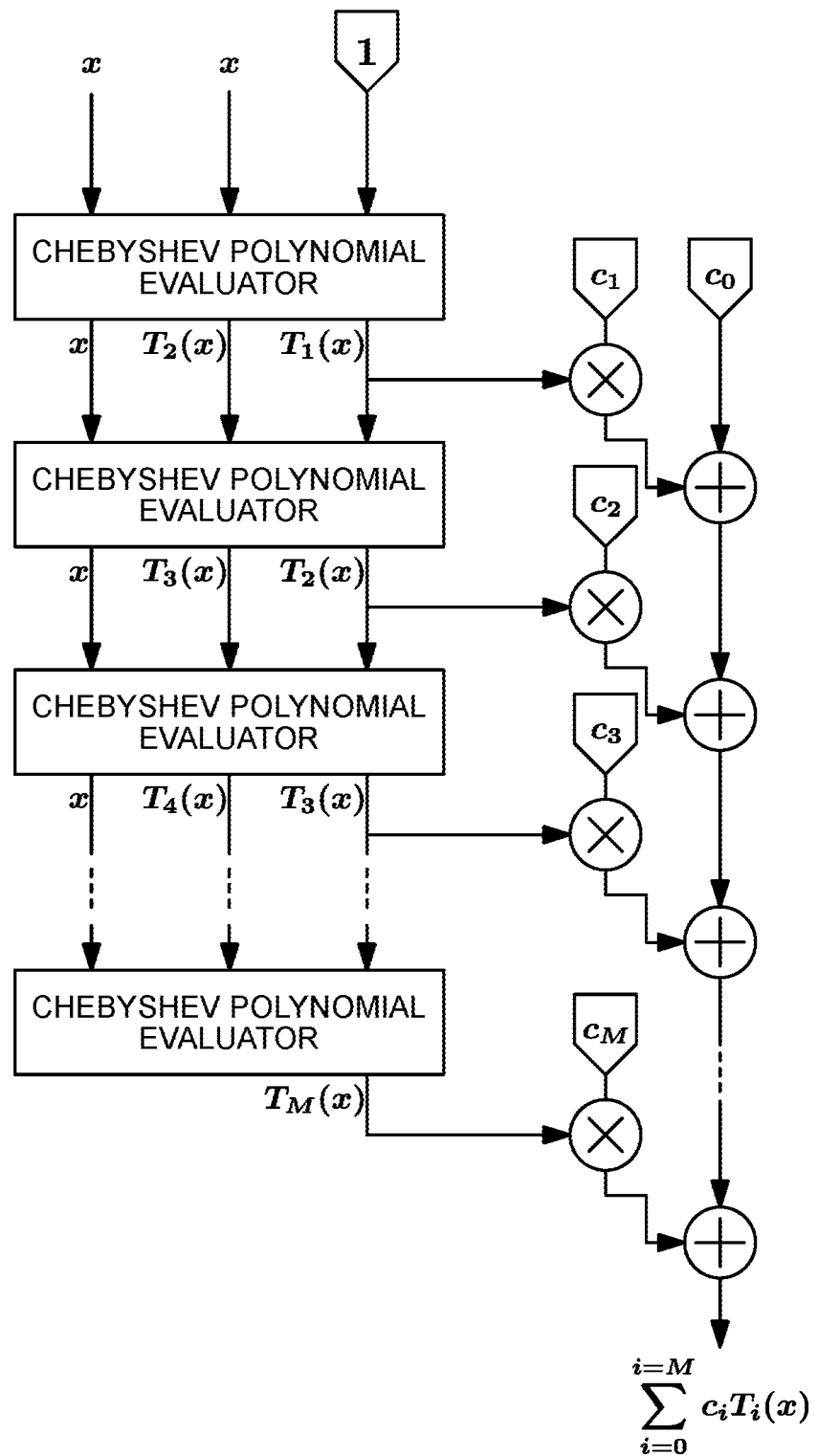
FIG. 4 depicts one embodiment of the implementation of a non-linear-function generator. The implementation is based on Equation 10, takes as input the value $T_0(x)=1$ and $T_1(x)=x$ (so these values are not real inputs), and produces the output $\hat{I}(x)=I(u)$.

An embodiment of the implementation of the non-linear-function generator in the analog domain is shown in FIG. 4. The implementation relies on the recurrence relationship introduced earlier (see Equation 4, above) to calculate the interpolant value.

As shown in FIG. 4, the only input is the value x, which is obtained as output of the scaling stage (see FIG. 3). The values $T_0(x)$ and $T_1(x)$ are not real inputs: $T_0(x)=1$ and can be programmed directly, while $T_1(x)=x$, which implies that x is used as input twice. The programming of the non-linear-function generator requires the values of the M+1 coefficients $c_0, \ldots, c_M$ obtained during the computation of the interpolation. The output of the non-linear-function generator is the value of the interpolant as a linear combination of Chebyshev polynomials.

b. Chebyshev Polynomial Evaluator

Figure 5:
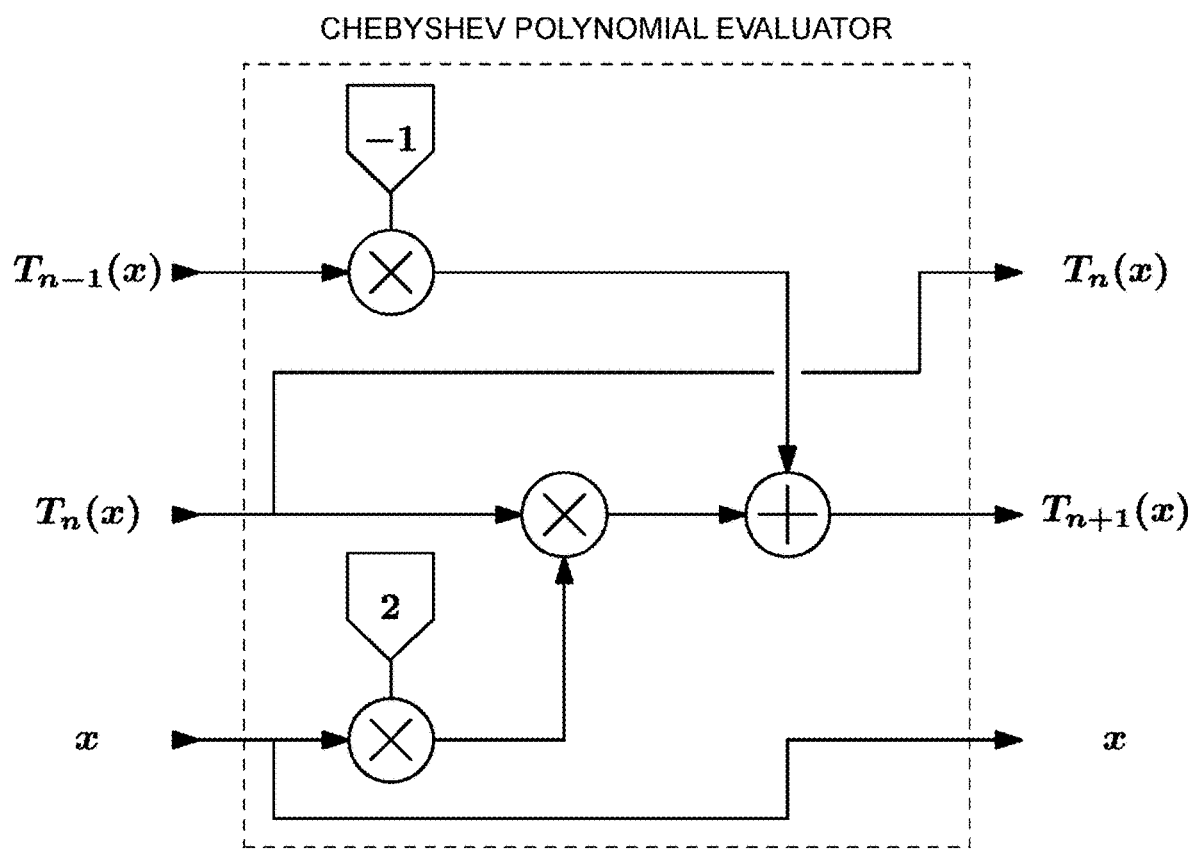
FIG. 5 depicts one embodiment of a Chebyshev-polynomial-evaluator diagram. The Chebyshev-polynomial evaluator is the implementation of the recurrence relationship given in Equation 4. The Chebyshev-polynomial evaluator takes as inputs the values $T_{n-1}(x)$, $T_n(x)$, and x, and produces as outputs the values $T_n(x)$ and $T_{n+1}(x)$. The value x is also part of the outputs so that these evaluators can easily be chained.

An embodiment of the implementation of the Chebyshev polynomial evaluator block from FIG. 4 is shown in FIG. 5. This block is a direct implementation of the recurrence relation given in Equation 4, above, and no specific programming is required.

Notably, the above implementation can be simplified by pre-calculating 2x and using this value as inputs of the various blocks (this reduces the number required multiplier elements). It should also be noted that similar methods can be implemented for other families of polynomials (e.g., Laguerre polynomials). However, it is generally accepted in the industry that Chebyshev polynomials are the best choice for dealing with polynomial interpolation.

IV. Alternative Embodiments and Other Variations

The various embodiments and variations thereof described herein, including the descriptions in any appended Claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and Claims herein.

What is claimed is:

1. An improved physical electronic hybrid computer, comprising at least one non-linear-function generator, wherein with respect to a non-linear function of interest, and with respect to a desired level of accuracy, said at computer is adapted to perform the following steps:

with respect to Chebyschev polynomial interpolation, selecting a degree of interpolation;

digitally calculating interpolation coefficients for the function of interest to the selected degree of interpolation, thereby giving rise to an interpolant;

carrying out by means of digital calculation a comparison between the interpolant and the function of interest, by means of an error metric, arriving at an error value;

if the error value is consistent with the desired level of accuracy, then loading the interpolation coefficients into the function generator, and carrying out analog computation in which analog values are received as inputs to the function generator and analog values are yielded as outputs from the function generator; or if the error value is inconsistent with the desired level of accuracy, then selecting a higher degree of interpolation and repeating the steps set forth above.

2. The improved physical electronic hybrid computer of claim 1 wherein the error metric is a root-means-squared measure.

3. The improved physical electronic hybrid computer of claim 1, wherein said non-linear function of interest is selected from the group consisting of sine, cosine, logarithm and exponential.

4. A method for use with an improved physical electronic hybrid computer, the hybrid computer comprising at least one non-linear-function generator, the method carried out with respect to a non-linear function of interest, and with respect to a desired level of accuracy, the method comprising the steps of:

with respect to Chebyschev polynomial interpolation, selecting a degree of interpolation; digitally calculating interpolation coefficients for the function of interest to the selected degree of interpolation, thereby giving rise to an interpolant;

carrying out by means of digital calculation a comparison between the interpolant and the function of interest, by means of an error metric, arriving at an error value;

responsive to the error value being consistent with the desired level of accuracy, loading the interpolation coefficients into the function generator, and carrying out analog computation in which analog values are received as inputs to the function generator and analog values are yielded as outputs from the function generator.

5. A method for use with an improved physical electronic hybrid computer, the hybrid computer comprising at least one non-linear-function generator, the method carried out with respect to a non-linear function of interest, and with respect to a desired level of accuracy, the method comprising the steps of:

with respect to Chebyschev polynomial interpolation, selecting a first degree of interpolation; digitally calculating interpolation coefficients for the function of interest to the first degree of interpolation, thereby giving rise to an interpolant;

carrying out by means of digital calculation a comparison between the interpolant and the function of interest, by means of an error metric, arriving at an error value;

responsive to the error value not being consistent with the desired level of accuracy by selecting a second degree of interpolation, the second degree being higher than the first degree, digitally calculating interpolation coefficients for the function of interest to the second degree of interpolation, thereby giving rise to the interpolant;

carrying out by means of digital calculation a comparison between the interpolant and the function of interest, by means of an error metric, arriving at an error value;

responsive to the error value being consistent with the desired level of accuracy, loading the interpolation coefficients into the function generator, and carrying out analog computation in which analog values are received as inputs to the function generator and analog values are yielded as outputs from the function generator.

* * * * *